United States Patent
Vorabbi et al.

(10) Patent No.: US 10,825,137 B2
(45) Date of Patent: Nov. 3, 2020

(54) SYSTEMS AND METHODS FOR PRE-LOCALIZATION OF REGIONS OF INTEREST FOR OPTICAL CHARACTER RECOGNITION, AND DEVICES THEREFOR

(71) Applicant: DATALOGIC IP TECH, S.R.L., Bologna (IT)

(72) Inventors: Lorenzo Vorabbi, Rimini (IT); Stefano Santi, Eugene, OR (US)

(73) Assignee: Datalogic IP Tech, S.r.l., Bologna (IT)

( * ) Notice: Subject to any disclaimer, the term of this patent is extended or adjusted under 35 U.S.C. 154(b) by 99 days.

(21) Appl. No.: 16/248,046

(22) Filed: Jan. 15, 2019

(65) Prior Publication Data

US 2020/0226715 A1   Jul. 16, 2020

(51) Int. Cl.
| | |
|---|---|
| G06K 9/36 | (2006.01) |
| G06T 3/40 | (2006.01) |
| G06K 9/00 | (2006.01) |
| G06T 5/20 | (2006.01) |
| G06K 9/32 | (2006.01) |

(52) U.S. Cl.
CPC ........ G06T 3/4038 (2013.01); G06K 9/00463 (2013.01); G06K 9/3233 (2013.01); G06T 5/20 (2013.01)

(58) Field of Classification Search
CPC ..... G06T 3/4038; G06T 5/20; G06K 9/00463; G06K 9/3233
USPC ............... 382/284, 190, 274, 181, 254, 260
See application file for complete search history.

(56) References Cited

U.S. PATENT DOCUMENTS

| | | | | |
|---|---|---|---|---|
| 5,875,264 | A * | 2/1999 | Carlstrom | G06K 9/50 382/181 |
| 6,047,893 | A | 4/2000 | Saporetti | |
| 6,640,002 | B1 * | 10/2003 | Kawada | G06T 7/0004 348/87 |

(Continued)

FOREIGN PATENT DOCUMENTS

EP   0851374 A1   7/1998

OTHER PUBLICATIONS

Pezeshk et al., "Automatic Feature Extraction and Text Recognition From Scanned Topographic Maps," IEEE Transactions on Geoscience and Remote Sensing 49(12), Dec. 2011, 17 pages.

(Continued)

*Primary Examiner* — Marceau Milord
(74) *Attorney, Agent, or Firm* — Cozen O'Connor

(57) ABSTRACT

A method of operation of an optical character recognition pre-localization system, comprising receiving an image having an original frame to be pre-processed for optical character recognition, applying a pyramid filter to the original frame in order to create a filtered image containing blobs to be analyzed as potential regions of interest that may contain characters, tiling the filtered image into a set of tiles of a defined tile size, and for each tile, determining a contrast, a module value and a gradient angle, identifying a first tile of the set of tiles of the filtered image, wherein the contrast and the module values of the first tile are higher than a respective contrast threshold and module threshold, and generating at least one region of interest of the original frame to be passed to an optical character recognition decoding module based on the first tile, and related systems.

20 Claims, 5 Drawing Sheets

(56) References Cited

U.S. PATENT DOCUMENTS

| | | | | |
|---|---|---|---|---|
| 8,385,971 B2* | 2/2013 | Rhoads | ............... | G06K 9/6253 |
| | | | | 455/556.1 |
| 8,406,570 B2* | 3/2013 | Morimoto | ............ | G06K 9/3208 |
| | | | | 358/1.5 |
| 8,587,818 B2* | 11/2013 | Imaizumi | ............ | H04N 1/3878 |
| | | | | 348/207.2 |
| 8,837,806 B1* | 9/2014 | Ethington | ................ | G06T 5/40 |
| | | | | 382/140 |
| 9,414,780 B2* | 8/2016 | Rhoads | ................ | G06F 16/245 |
| 10,074,031 B2* | 9/2018 | Krenzer | ............ | G06K 9/00597 |
| 2002/0131642 A1* | 9/2002 | Lee | ..................... | G06K 9/6203 |
| | | | | 382/220 |
| 2002/0186874 A1* | 12/2002 | Price | ....................... | G06T 7/11 |
| | | | | 382/133 |
| 2003/0095197 A1* | 5/2003 | Wheeler | ................ | H04N 1/624 |
| | | | | 348/241 |
| 2004/0154358 A1* | 8/2004 | Yu | ....................... | E05B 73/0005 |
| | | | | 70/30 |
| 2006/0098854 A1* | 5/2006 | Oosawa | ................ | G06T 7/0012 |
| | | | | 382/128 |
| 2009/0207281 A1* | 8/2009 | Ono | ..................... | H04N 5/2351 |
| | | | | 348/234 |
| 2012/0268606 A1* | 10/2012 | Liu | ........................ | G06Q 10/06 |
| | | | | 348/159 |
| 2014/0028895 A1* | 1/2014 | Endo | .................. | H04N 5/23212 |
| | | | | 348/348 |
| 2015/0003699 A1* | 1/2015 | Davis | ..................... | G16H 50/20 |
| | | | | 382/128 |
| 2015/0097768 A1* | 4/2015 | Holz | ..................... | G06F 3/0425 |
| | | | | 345/156 |
| 2015/0310601 A1* | 10/2015 | Rodriguez | ........... | G07G 1/0072 |
| | | | | 348/150 |
| 2015/0358557 A1* | 12/2015 | Terre | .................. | H04N 5/23219 |
| | | | | 348/164 |
| 2016/0335475 A1* | 11/2016 | Krenzer | ..................... | G06T 7/77 |
| 2019/0347801 A1* | 11/2019 | Ellison | .................... | G06T 7/136 |
| 2020/0184278 A1* | 6/2020 | Zadeh | ..................... | G06N 3/006 |

OTHER PUBLICATIONS

Ye et al., "Text Detection and Recognition in Imagery: A Survey," IEEE Transactions on Pattern Analysis and Machine Intelligence 37(7), Jun. 2015, 20 pages.

* cited by examiner

101. Receiving an image to be processed

102. Applying a pyramid filter to create a filtered image

103. Tiling the filtered image into a set of tiles

104. For each tile in the set of tiles, determining a contrast, a module value and a gradient angle

105. Identifying a first tile having:

contrast > contrast threshold, a module value > than a module value threshold a gradient angle within a gradient angle threshold of the gradient angle of an adjacent tile

106. Generating a region of interest based on the first tile

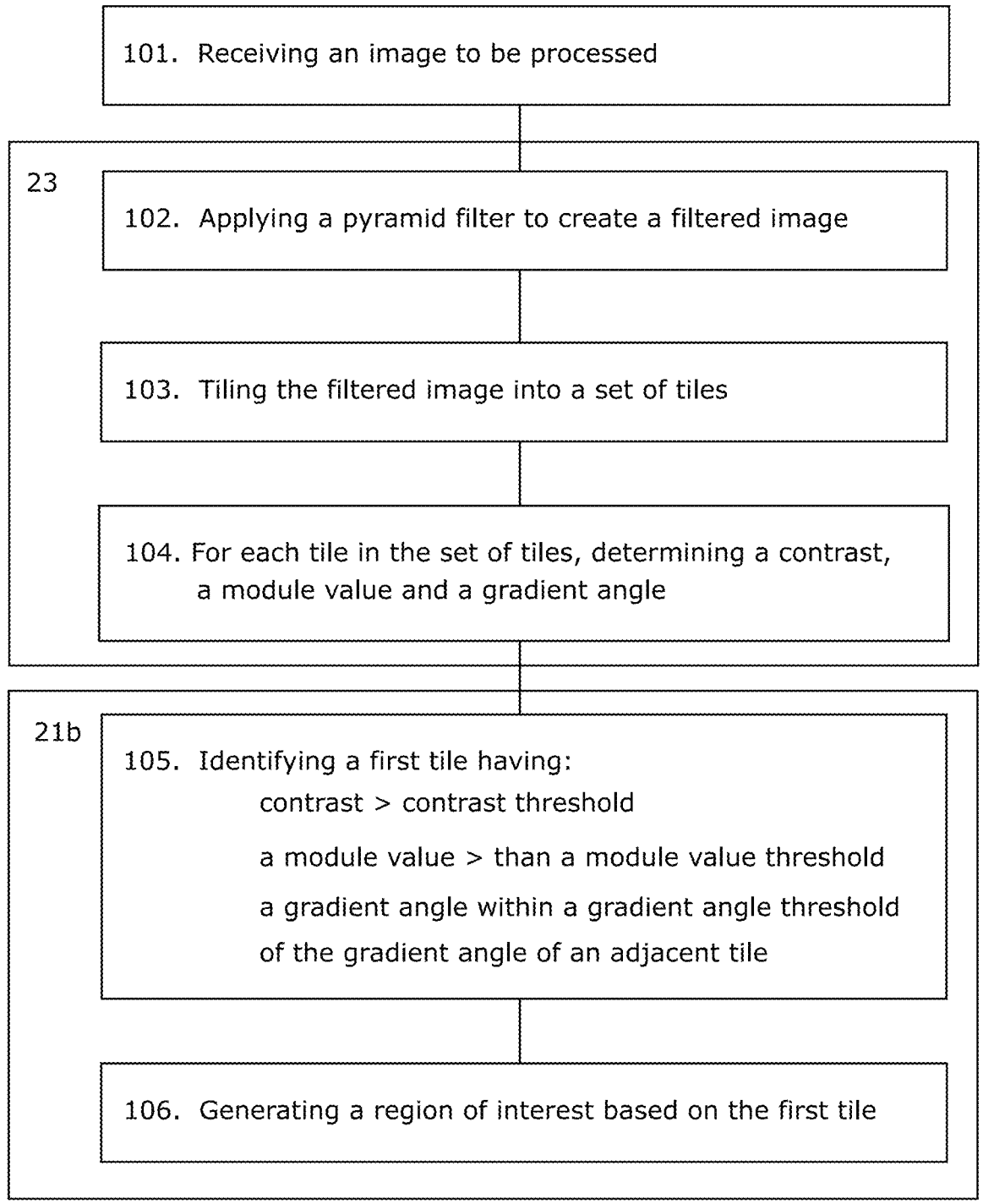

SYSTEMS AND METHODS FOR PRE-LOCALIZATION OF REGIONS OF INTEREST FOR OPTICAL CHARACTER RECOGNITION, AND DEVICES THEREFOR

BACKGROUND

Technical Field

This description generally relates to the optical character recognition (OCR), and more specifically to the identification of regions of interest (ROI) on a document to be processed by an OCR system.

BRIEF SUMMARY

A method of operation of an optical character recognition pre-localization system, may include receiving an image, which may include an original frame, to be pre-processed for optical character recognition, and applying a pyramid filter to the original frame in order to create a filtered image containing blobs to be analyzed as potential regions of interest that may contain characters. The method may further include tiling the filtered image into a set of tiles of a defined tile size, and for each tile, determining a contrast, a module value and a gradient angle. The method may further include identifying a first tile of the set of tiles of the filtered image, wherein the contrast and the module values of the first tile are higher than a respective contrast threshold and module threshold, and generating at least one region of interest of the original frame to be passed to an optical character recognition decoding module based on the first tile.

The applying a pyramid filter to the original frame may include applying two levels of pyramid filters. The system may include a field programmable gate array, and the applying a pyramid filter to the original frame may include applying a pyramid filter to the original frame by the field programmable gate array.

The tiling the filtered image into a set of tiles of a defined tile size, may include the defined tile size being 8×8 pixels. The tiling the filtered image into a set of tiles of a defined tile size, may include the defined tile size being 16×16 pixels. The system may include a field programmable gate array, and the tiling the filtered image into a set of tiles of a defined tile size may include tiling the filtered image into a set of tiles by the field programmable gate array.

The filtered image may include image rows corresponding to the set of tiles, and the for each tile determining a contrast, a module value and a gradient angle further may include appending the determined contrast, module value and gradient angle for each tile to the image rows corresponding to the respective tiles. The system may include a field programmable gate array, and the for each tile determining a contrast, a module value and a gradient angle, may include determining the contrast, the module value and the gradient angle by the field programmable gate array.

The identifying a first tile of the set of tiles of the filtered image, wherein the contrast and the module values of the first tile are higher than a respective contrast threshold and module threshold further includes the first tile having a difference between the gradient angle of the first tile and the gradient angle of an adjacent tile is less than a gradient angle threshold, wherein the adjacent tile may be one of a set of tiles adjacent to the first tile. The system may include a central processing unit, and the identifying a first tile of the set of tiles of the filtered image, wherein the contrast and the module values of the first tile are higher than a respective contrast threshold and module threshold may further include identifying a first tile of the set of tiles of the filtered image, wherein the contrast and the module values of the first tile are higher than a respective contrast threshold and module threshold, by the central processing unit.

The system may include a central processing unit, and the generating at least one region of interest of to be passed to an optical character recognition may include generating at least one region of interest by the central processing unit. The generating at least one region of interest to be passed to an optical character recognition decoding module, may include generating the at least one region of interest via a number of perimeter clusters. The generating at least one region of interest to be passed to an optical character recognition decoding module may include generating at least one region of interest via at least one major axis computation. The generating at least one region of interest to be passed to an optical character recognition decoding module may include generating at least one region of interest via at least one minor axis computation. The generating at least one region of interest to be passed to an optical character recognition decoding module may include growing at least one region of interest around the first tile through analysis of adjacent tiles based on the contrast, module value or gradient angle of the adjacent tiles.

The for each tile determining a contrast, a module value and a gradient angle, may include using a Saporetti transform to determine the module value and gradient angle for each tile. The for each tile determining a contrast, a module value and a gradient angle, may include determining a respective gradient vector for each tile such that the respective module value is a magnitude of the respective gradient vector, and the respective gradient angle corresponds to a direction of the respective gradient vector.

An optical character pre-localization system, may include at least one processor and a memory. The memory may store a processor-executable set of instructions that, as a result of execution by the at least one processor causes the system to: receive an image, comprising an original frame, to be pre-processed for optical character recognition; apply a pyramid filter to the original frame in order to create a filtered image containing blobs to be analyzed as potential regions of interest that may contain characters; tile the filtered image into a set of tiles of a defined tile size; for each tile, determine a contrast a module value and a gradient angle; identify a first tile of the set of tiles of the filtered image, wherein the contrast and the module values of the first tile are higher than a respective contrast threshold and module threshold; and generate at least one region of interest of the original frame to be passed to an optical character recognition decoding module based on the first tile.

The pyramid filter applied to the original frame may include a two-level pyramid filter. The at least one processor may include a field programmable gate array, and when executed the processor-executable instructions may cause the field programmable gate array to apply a pyramid filter to the original frame. The defined tile size may be 8×8 pixels. The defined tile size may be 16×16 pixels. The at least one processor may include a field programmable gate array, and when executed the processor-executable instructions may cause the field programmable gate array to tile the filtered image into a set of tiles of a defined tile size.

The filtered image may include image rows corresponding to the set of tiles, and wherein when executed the processor-executable instructions may cause the system to determine a contrast, a module value and a gradient angle, may further include causing the system to append the contrast, module value and gradient angle for each tile to the image rows corresponding to the respective tiles. The processor may include a field programmable gate array, and when executed the processor-executable instructions may cause the system to determine a contrast, a module value and a gradient angle, and may include the execution by the field programmable gate array of a subset of the set of instructions to cause the system to determine a contrast, a module value and a gradient angle.

When executed the processor-executable instructions may cause the system to identify a first tile of the set of tiles of the filtered image, wherein the contrast and the module values of the first tile are higher than a respective contrast threshold and module threshold, and may further include the first tile having a difference between the gradient angle of the first tile and the gradient angle of an adjacent tile that is less than a gradient angle threshold, wherein the adjacent tile is one of a set of tiles adjacent to the first tile. The at least one processor may include a central processing unit, and wherein when executed the processor-executable instructions cause the central processing unit to identify a first tile of the set of tiles of the filtered image, wherein the contrast and the module values of the first tile are higher than a respective contrast threshold and module threshold may further include execution by the central processing unit of a subset of the set of instructions to cause the system to identify a first tile of the set of tiles of the filtered image, wherein the contrast and the module values of the first tile are higher than a respective contrast threshold and module threshold.

The system may include a central processing unit, and wherein when executed the processor-executable instructions cause the central processing unit to generate at least one region of interest of to be passed to an optical character recognition decoding module. When executed the processor-executable instructions cause the system to generate at least one region of interest to be passed to an optical character recognition decoding module, may include causing the system to generate the at least one region of interest via a number of perimeter clusters. When executed the processor-executable instructions cause the system to generate at least one region of interest to be passed to an optical character recognition decoding module may include causing the system to generate the at least one region of interest via at least one major axis computation. When executed, the processor-executable instructions cause the system to generate at least one region of interest to be passed to an optical character recognition decoding module may include causing the system to generate the at least one region of interest via at least one minor axis computation. When executed the processor-executable instructions cause the system to generate at least one region of interest to be passed to an optical character recognition decoding module may include causing the system to grow at least one region of interest around the first tile through analysis of adjacent tiles based on the contrast, module value or gradient angle of the adjacent tiles.

To determine a module value and a gradient angle for each tile, may include causing the system to use Saporetti transform to determine the module value and the gradient angle for each tile. To determine a module value and a gradient angle for each tile, may include causing the system to determine a respective gradient vector for each tile such that the respective module value may be a magnitude of the respective gradient vector, and the respective gradient angle may correspond to a direction of the respective gradient vector.

An optical character pre-localization system, may include a central processing unit, a field programmable gate array, and a memory. The field programmable gate array may be programmed to: receive an image, which may include an original frame, to be pre-processed for optical character recognition; apply a pyramid filter to the original frame in order to create a filtered image containing blobs to be analyzed as potential regions of interest that may contain characters; tile the filtered image into a set of tiles of a defined tile size; and for each tile in the set of tiles, determine a contrast, a module value and a gradient angle. The memory may store a set of instructions that, as a result of execution by the processor causes the system to: identify a first tile of the set of tiles of the filtered image, wherein the contrast and the module values of the first tile are higher than a respective contrast threshold and module threshold, and generate at least one region of interest of the original frame to be passed to an optical character recognition decoding module based on the first tile.

The pyramid filter applied to the original frame may be a two-level pyramid filter. The defined tile size may be 8×8 pixels. The defined tile size may be 16×16 pixels. The filtered image may include image rows corresponding to the set of tiles, and the field programmable gate array may further be programmed to append the contrast, module value and gradient angle for each tile to the image rows corresponding to the respective tiles.

The memory storing a set of instructions that, as a result of execution by the central processing unit causes the system to identify a first tile of the set of tiles of the filtered image, wherein the contrast and the module values of the first tile are higher than a respective contrast threshold and module threshold may further include the first tile having a difference between the gradient angle of the first tile and the gradient angle of an adjacent tile that is less than a gradient angle threshold, wherein the adjacent tile is one of a set of tiles adjacent to the first tile.

The memory, storing a set of instructions that, as a result of execution by the central processing unit causes the system to generate at least one region of interest to be passed to an optical character recognition decoding module may include causing the system to generate the at least one region of interest via a number of perimeter clusters. The memory, storing a set of instructions that, as a result of execution by the central processing unit causes the system to generate at least one region of interest to be passed to an optical character recognition decoding module may include causing the system to generate the at least one region of interest via at least one major axis computation. The memory, storing a set of instructions that, as a result of execution by the central processing unit causes the system to generate at least one region of interest to be passed to an optical character recognition decoding module may include causing the system to generate the at least one region of interest via at least one minor axis computation. The memory, storing a set of instructions that, as a result of execution by the central processing unit causes the system to generate at least one region of interest to be passed to an optical character recognition decoding module may include causing the system to grow at least one region of interest around the first tile through analysis of adjacent tiles based on the contrast, module value or gradient angle of the adjacent tiles.

The memory, storing a set of instructions that, as a result of execution by the central processing unit causes the system to for each tile determine a contrast a module value and a gradient angle, may include causing the system to determine a respective gradient vector for each tile such that the respective module value is a magnitude of the respective gradient vector, and the respective gradient angle corresponds to a direction of the respective gradient vector.

A method of operation of an optical character pre-localization system comprising, a field programmable gate array, a central processing unit, a memory, the method may include: providing an image to the field programmable gate array, the image comprising an original frame, to be pre-processed for optical character recognition; applying a pyramid filter to the original frame in the field programmable gate array in order to create a filtered image containing blobs to be analyzed as potential regions of interest that may contain characters; tiling the filtered image into a set of tiles of a defined tile size in the field programmable gate array; and for each tile, determining in the field programmable gate array a contrast, a module value and a gradient angle; identifying a first tile of the set of tiles of the filtered image in the central processing unit, wherein the contrast and the module values of the first tile are higher than a respective contrast threshold and module threshold; and generating, in the central processing unit, at least one region of interest of the original frame to be passed to an optical character recognition decoding module based on the first tile.

The applying a pyramid filter to the original frame may include applying two levels of pyramid filters. The tiling the filtered image into a set of tiles of a defined tile size, the defined tile size may be 8×8 pixels. The tiling the filtered image into a set of tiles of a defined tile size, the defined tile size may be 16×16 pixels.

The filtered image may include image rows corresponding to the set of tiles, and wherein the for each tile determining a contrast, a module value and a gradient angle further comprises appending the computed contrast, module value and gradient angle for each tile to the image rows corresponding to the respective tiles.

The identifying a first tile of the set of tiles of the filtered image, wherein the contrast and the module values of the first tile are higher than a respective contrast threshold and module threshold may further include the first tile having a difference between the gradient angle of the first tile and the gradient angle of an adjacent tile that is less than a gradient angle threshold, wherein the adjacent tile is one of a set of tiles adjacent to the first tile.

The generating at least one region of interest to be passed to an optical character recognition decoding module may include generating the region of interest via a number of perimeter clusters. The generating at least one region of interest to be passed to an optical character recognition decoding module may include generating at least one region of interest via at least one major axis computation. The generating at least one region of interest to be passed to an optical character recognition decoding module may include generating at least one region of interest via at least one minor axis computation. The generating at least one region of interest to be passed to an optical character recognition decoding module may include growing at least one region of interest around the first tile through analysis of adjacent tiles based on the contrast, module value or gradient angle of the adjacent tiles.

The for each tile determining a contrast, a module value and a gradient angle, may include using a Saporetti transform to determine the module value and gradient angle for each tile. The for each tile determining a contrast, a module value and a gradient angle, may include determining a respective gradient vector for each tile such that the respective module value is a magnitude of the respective gradient vector, and the respective gradient angle corresponds to a direction of the respective gradient vector.

The computational system that implements an optical character pre-localization system may include the memory further storing a set of instructions that, as a result of execution, cause the system to perform the methods described above.

A non-transitory computer-readable medium may further store a set of instructions that, as a result of execution, may cause at least one computer processor to perform the methods described above.

BRIEF DESCRIPTION OF THE SEVERAL VIEWS OF THE DRAWINGS

FIG. 3 is a flow diagram showing an implementation of a method of operating an optical character recognition pre-localization system.

FIG. 4 is flow diagram chart showing an implementation of a method of operating an optical character recognition pre-localization system using hardware optimization.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In some instances, structures and methods associated with image acquisition and processing, and optical character recognition, have not been shown or described in detail to avoid unnecessarily obscuring descriptions of the implementations.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

As used herein the terms "optical character recognition" or "OCR" refer to computer image processing system that recognizes symbols, such as alphanumeric symbols, in a source image. One of ordinary skill in the image processing arts and text recognition will readily appreciate the broad applicability of the systems, methods, and apparatuses described herein across any number of alphabets, symbologies, and numeric systems. In some instances, well-known structures associated with machine-readable symbol readers, computing systems including client and server computing systems, processors (e.g., field programmable gate arrays (FPGAs), application specific integrated circuits (ASICs)), as well as networks, including various types of telecommunications networks, have not been shown or described in detail to avoid unnecessarily obscuring descriptions of the implementations.

Description of System Environments

Figure 1:
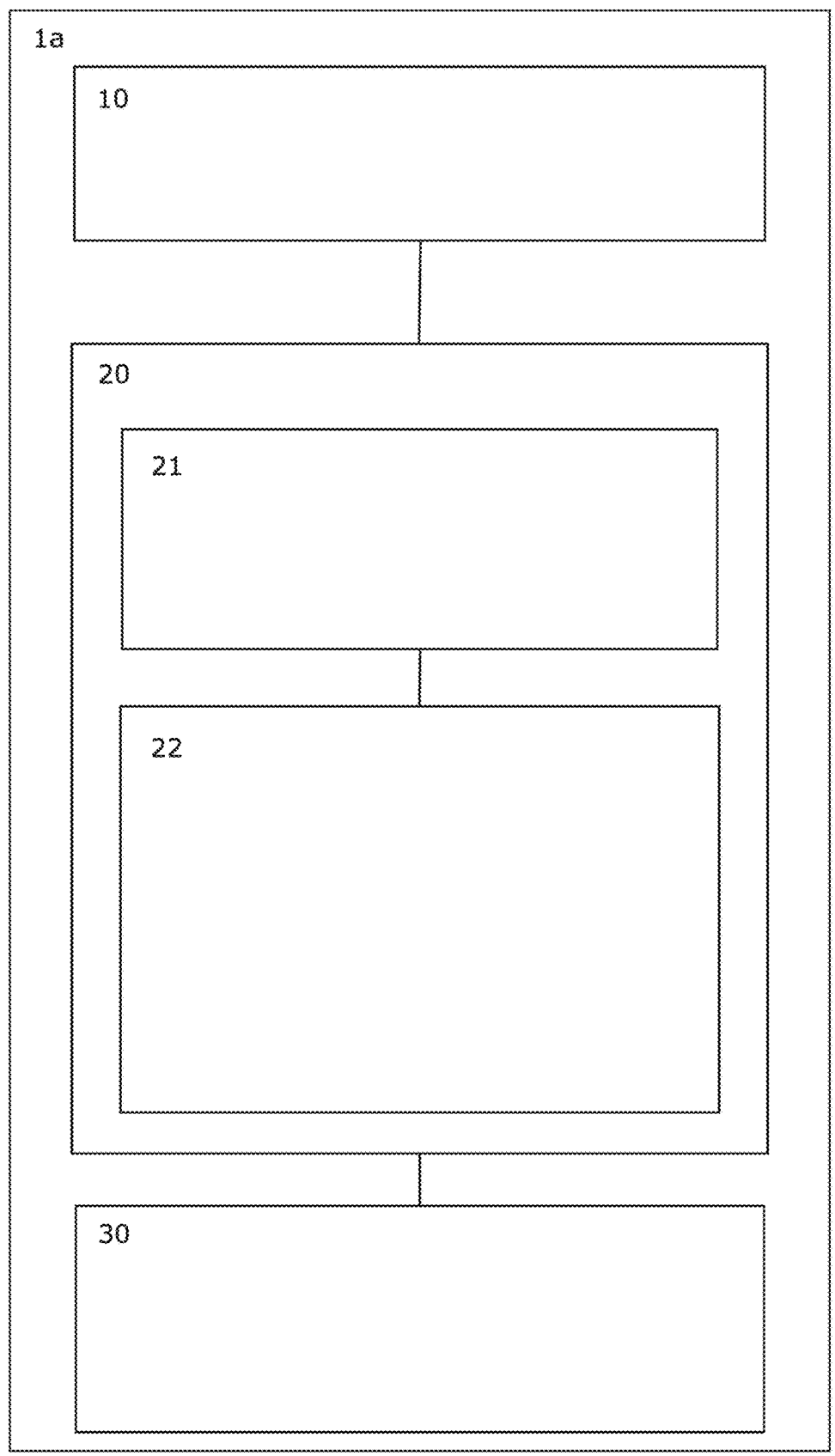
FIG. 1 is a schematic diagram of an optical character recognition pre-localization system, according to at least one implementation.
Figure 2:
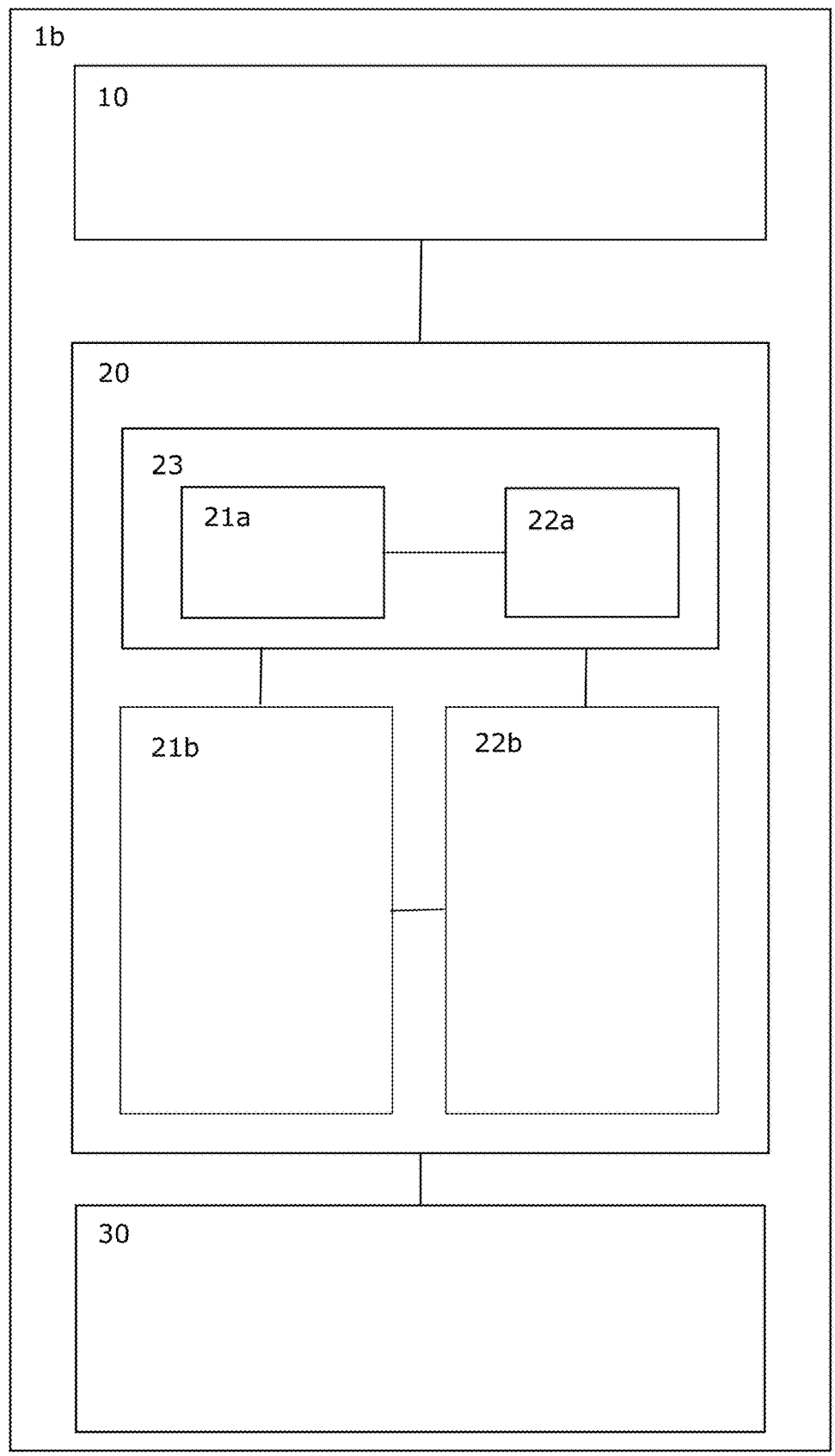
FIG. 2 is schematic diagram of an optical character recognition pre-localization system, according to at least another implementation.

FIGS. 1 and 2 show optical character recognition environments 1a, 1b. The environments 1a, 1b may include and/or be embodied on a single computer or machine, or may be distributed across multiple computers and/or accessories, and involve the use of local area networks, the Internet and other wide-area networks, cloud computing, mobile devices, or any other suitable equipment that persons of skill in the art may want to include in their implementation of the disclosed concepts. The environment 1a, 1b may comprise one or more computational systems that communicate over a network with other entities in the environment or with outside systems. The computational systems within the environment 1a, 1b may comprise software and hardware including one or more processors coupled to one or more memories storing a set of executable instructions that, as a result of execution by the one or more processors, cause their respective computational system 1a, 1b to perform one or more operations described herein. The computational systems may include additional components to fulfill the operations described herein, such as a communication interface for communicating over the network. The network may include public and private networks, such as cellular telephone networks, the internet, local area networks, and wide area networks, by way of non-limiting example.

The optical character recognition system may include an image acquisition module or system 10, an optical character recognition pre-localization module or system 20, and an optical character recognition module or system 30. The image acquisition module or system 10 may be capable of acquiring or receiving an image to be processed by the optical character recognition pre-localization module or system 20 and the optical character recognition module or system 30. The image acquisition module or system 10 may include a scanner, camera, or other specialized sensor or hardware device that is capable of directly acquiring an image to be processed. Alternatively, the image acquisition module or system 10 may include a transceiver or other network communication device which can receive an image to be processed from an outside source.

As described in greater detail below, the optical character recognition pre-localization module or system 20 analyzes and processes the image in order to identify regions of interest for the optical character recognition module and may implement any of the methods described below with respect to FIGS. 3-7. The optical character recognition pre-localization module or system 20 may include a memory 21 and a processor 22. The memory 21 may be any non-transitory processor-readable media ROM, RAM 21b, virtual memory, hard drives, such as solid state drives or hard disk drives, optical disc drives, flash drives, embedded memory, such as FPGA embedded memory 21a, onboard memory in a scanning device or accessory that may also be part of the image acquisition module or system 10, or any other suitable memory known in the art or to be discovered. Persons of skill in the art will recognize that the memory 21 may each comprise a single memory device 21, as illustrated in implementation shown in FIG. 1. Alternatively, the memory 21 may comprise multiple memory devices. For example, as shown in FIG. 2, the memory may include the field programmable gate array 23 embedded memory 21a and ram 21a. Persons of skill in the art will further recognize that the same memory 21, 21a, 21b may service the image acquisition module or system 10 or the optical character recognition module or system 30 as well as the optical character recognition pre-localization module or system 20. The processor 22 may be a general purpose central processing unit (22b), a field programmable gate array 23, 22b, a graphics processing unit, an application specific integrated circuit, digital signal processor, programmable logic unit, a single instruction multiple data co-processor, or any other suitable processor known in the art or to be discovered. Persons of skill in the art will recognize that the processor 22 may each comprise a single processor device 22, as illustrated in implementation shown in FIG. 1. Alternatively, the processor 22 may comprise multiple processing devices 22, 22a, 22b. For example, as shown in FIG. 2, the processor 22 may include the field programmable gate array 23 processing circuits 22b and a central processing unit 22a. Persons of skill in the art will further recognize that the same processors 22, 22a, 22b may service the image acquisition module or system 10 or the optical character recognition module or system 30 as well as the optical character recognition pre-localization module or system 20.

The optical character recognition module or system 30 performs the image processing analysis required to actually identify text and/or other symbols in that are present in the image. As discussed above it may further use information about regions of interest identified by the optical character pre-localization module or system 20 to assist in this process.

FIG. 3 shows a method of operating an optical character recognition pre-localization system 100, according to at least one implementation.

At 101, the optical character recognition pre-localization system receives an image to be processed 101, where the image may include an original frame, to be pre-processed for optical character recognition. At 102 the optical character recognition pre-localization system applies a pyramid filter to the original frame in order to create a filtered image 102, the filtered image containing blobs to be analyzed as potential regions of interest that may contain characters.

At 103, the optical character recognition pre-localization system tiles the filtered image into a set of tiles of a defined tile size 103. At 104, for each tile, the optical character recognition pre-localization system determines a contrast, a module value and a gradient angle 104. The gradient angle may be measured in degrees, radians, mils, or any other suitable measurement known in the art.

At 105, the optical character recognition pre-localization system identifies a first tile of the set of tiles of the filtered image 105. The optical character recognition pre-localization system may determine the first tile based on the contrast and the module values of the first tile being higher than a respective contrast threshold and module threshold. Additionally or alternative, the optical character recognition pre-localization system may determine the first tile based on the gradient angle of the first tile being within a gradient threshold of the gradient angle of an adjacent tile that is adjacent to the first tile.

At 106, the optical character recognition pre-localization system generates a region of interest of the original frame based on the first tile 106. The region of interest may be passed to an optical character recognition decoding module.

Receiving an image to be processed 101, may involve receiving an image from any suitable image acquisition module or system 10. The image 2 may comprise an original frame that may be a gray-scale image having intensity values from 0 to 100% in any known format, including but not limited to JPG, GIF, PNG, PIC, IMG, TIFF, BMP, RAW, or any other suitable format. The image may be a color image. In implementations with color images, the implementation may any additional pre-processing techniques known in the art or to be developed to remove noise or irrelevant features in the image, and/or to convert the image from a color image to a gray-scale image. In such implementation, the disclosed concepts may be practiced on the original frame as received, or on the version of the original frame resulting from the additional preprocessing procedures.

Figure 6:
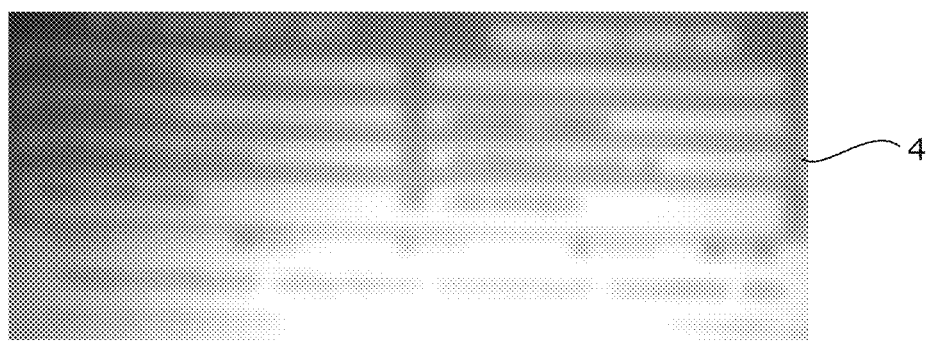
FIG. 6 illustrates a gray-scale, filtered image.

Applying a pyramid filter to the original frame in order to create a filtered image 102 may include blurring, smoothing or filtering the original image and sub-sampling the original image such that the filtered image is smaller than the original frame. The blurring, smoothing or filtering of the original image may be accomplished through low-pass filtering, band pass filtering, binomial filtering, Gaussian blurring, Laplacian blurring, pixel averaging, or any other suitable blurring, smoothing, or filtering method known in the art or to be developed. The sub-sampling aspect of the pyramid filter, as used herein and by convention, generally halves the length and width of the original image per level of pyramid filter that is use. Thus a 1920×1080 pixel image passed through a one level pyramid filter will result in a 960×540 pixel filtered image, and the 1920×1080 image passed through a two-level pyramid filter (or two levels of pyramid filtering) would result in a 480×270 pixel filtered image. The disclosed concepts may be implemented with a single layer pyramid filter, a two-level pyramid filter, or by any number of desired pyramid filter levels. Additionally, any suitable desired level of subsampling may be used. In other words instead of halving the original image per pyramid level, a single pyramid filter may be adjusted to subsample the image down to any desired size using a representative pixel, averaging, interpolation, or any other subsampling methods known in the art or to be developed. Persons of skill in the art will further recognize that the blurring, smoothing or filtering and subsampling processes may be run concurrently as a singular process, and need not be distinct processes within the application of the pyramid filter. As illustrated in FIG. 6, the resulting filtered image may contain resulting blobs to be analyzed as potential regions of interest that may contain characters to be recognized by the optical character recognition module or system 30.

Tiling the filtered image into a set of tiles of a defined tile size 103 may use any desired size of defined tile size. For example, the defined tile size may be 8×8 pixels, or 16×16 pixels, or any other suitable desired size, whether square, rectangular, or another desired shape.

Determining a contrast, a module value and a gradient angle 104 for each tile, may include determining the contrast, module value and gradient angle through any suitable method known in the art or to be developed. For example, the module value and the gradient angle through a Saporetti transform, as disclosed in U.S. Pat. No. 6,047,893, which is incorporated herein by reference in its entirety. The Saporetti transform was originally developed as a method for locating a one dimensional machine-readable symbol, such as a barcode, by identifying one or more tiles in a filtered image that have a significant module value and similar gradient angle to adjacent tile. It has not traditionally been used for optical character recognition because the gradient angles of letters are too varied to provide useful results. However, the present disclosure applies the Saporetti transform to tiles that have already had a pyramid filter applied to them, providing a more uniform/blurred gradient which has unexpectedly proved useful to identification of regions of interest for optical character recognition. The Saporetti transform may involve determining a gradient vector for each tile. The respective module value of a tile may be defined as the magnitude of the respective gradient vector for that tile. The respective gradient angle of a tile may corresponds to a direction of the respective gradient vector for the tile. Similarly, the contrast may be determined through any contrast methods known in the art or to be developed, including but not limited to high pass filtering, pixel intensity difference comparisons maximums, histogram equalization, and fast gray-level grouping. In some implementations, the resulting contrast, module values and gradient vectors for each tile may be appended to the filtered image and/or to the image to facilitate passing it to the processor that will handle the identification of a first tile 105. In such implementations, the filtered image or the original frame may comprise rows, such that the contrast, module values and gradient vectors for each of the tiles that correspond to that row may be appended to the image information for that row. In some implementations the module values may be normalized relative to the contrast. This may be done by dividing the module value by the contrast. This may be done at the time the module value for a tile is determined, or it may alternatively be done at the time the module value is compared to the module value threshold during while identifying a first tile or identifying a set of strong tiles.

Identifying a first tile of the set of tiles of the filtered image 105, may include examining each tile in the set of tiles to determine whether (1) the contrast of that tile is higher than a respective contrast threshold, (2) the module value of that tile is higher than a module threshold, and/or (3) the gradient angle of that tile may be within a gradient threshold of the gradient angle of an adjacent tile that is adjacent to the that tile. In other words, the identified first tile should have a contrast greater than a contrast threshold, a module value greater than a module value threshold, and a gradient angle such that the difference between the gradient angle of that tile and the gradient angle of an adjacent tile is less than a gradient angle threshold where the adjacent tile is one of the set of tiles that is adjacent to the first tile. Any suitable thresholds may be used, and a system can be implemented to allow a user to manually set or alter the thresholds as desired. For example, in some implementations, where an 8-bit grayscale level (from 0-255) is used, a contrast threshold of approximately 20 grayscale levels may be used. In implementations where the grayscale is a floating point number, a contrast threshold of between approximately 8-10% may be used. In some implementations a gradient module threshold of 10 may be used. As discussed above, the gradient modules may be normalized to the contrast before being compared to the gradient module threshold. In some implementations, an angle difference of approximately 4.2 degrees, 0.0733 radians, or 74.67 mils may be used. The optimal threshold values for any given implementation may depend on the type of input expected for that implementation.

The optical character pre-localization module or system may repeat this process until it identifies all suitable "first tiles" which can then be passed in to the generating a region of interest based on the first tile 106 (such that a region of interest is generated for each first tile, with overlapping regions of interest combined. In some implementations a set of strong tiles may be kept, where each tile in the set of strong tiles meets the first tile thresholds. Alternatively, the optical character recognition pre-localization module or system 20 may repeatedly loop through the identify a first tile 105 and generate a region of interest based on the first tile 106, and removing all tiles that form part of the generated region from consideration.

Generating a region of interest of the original frame based on the first tile 106, the region of interest to be passed to an optical character recognition decoding module may include growing the region by analysis and processing of the original frame, of the filtered image, or of any image resulting from image analysis of the original frame or the filtered image. The region of interest may be grown from the first tile, or from the pixels of the original frame corresponding to the first tile. Any suitable region growing algorithm or method known in the art or to be developed may be implemented with the disclosed concepts, including but not limited to generating a region of interest via a number of perimeter clusters, generating a region of interest via at least one major axis computation, generating a region of interest via at least one minor axis computation, and growing a region of interest around the first tile through analysis of adjacent tiles based on the contrast, module value or gradient angle of the adjacent tiles. In one implementation, a region may be grown by (1) selecting the first tile, or a pixel corresponding to the first tile, (2) executing a region growing algorithm gathering in the neighbors to the first tile or pixel, and repeating as long as adjacent tiles or pixels fall within the cluster, (3) computing the perimeter of each cluster, (4) determining the major axis and minor axes of the cluster to define the rectangle surrounding the region of interest. As part of the cluster formation, it may be advantageous to join pixels that have joining criteria (such as a contrast greater than the contrast threshold, a module value greater than the module value threshold, and a gradient angle difference less than the gradient angle threshold) that are within two pixels/tiles of a pixel/tile within the cluster. For example, for each pixel/tile in the cluster a kernel may be used checking two pixels to the left or right of the current pixel/tile, and one pixel/tile above or below the current pixel/tile to determine if the neighboring pixels/tiles should be joined to the current cluster. The perimeter computation may be evaluated by checking for each pixel whether any pixel/tile above, below or to the left or right of the current pixel/tile is outside of the cluster. The orientation of major axis may be computed as follows: a. compute center of mass of cluster (Cm); b. for each pixel Ci belonging to perimeter the line Li between Cm and Ci; c. for each pixel Cj ($j \neq i$) of the cluster it's computed the distance Dj from line Li and accumulated the result in Si; d. the pixel of the perimeter having the lowest Si is selected as pixel belonging to major axis; e. the minor axis may be selected as the axis that is perpendicular to the major axis; and f. the major and minor axes may be used to create the oriented rectangle containing the cluster of characters (i.e. the region of interest). The major axis and minor axis may be calculated by any suitable methodology known in the art or to be developed, including but not limited to, using the eigenvectors of a covariance matrix for the region of interest and using an image moment for the region of interest.

In implementations where a set of strong tiles is made, where each of the tiles in the set of strong tiles meets the first tile thresholds, regions of interest may be grown around each strong tile in the set of strong tiles. The tiles in the set of strong tiles may be ordered by strength (i.e. the degree to which they exceed the relevant threshold(s)), and regions of interest may be grown around the tiles in the set of strong tiles by their respective order of strength. To avoid duplicating regions of interest, whenever a respective tile in the set of strong tiles is added to a region of interest grown around another tile in the set of strong tiles, the respective tile may be removed from the list of strong tiles, such that each strong tile is only put into a single region of interest.

The memory may include a set of instructions which when executed by processor(s), such as the central processing unit, may cause the system to perform any or all of these methods. These methods may be repeated for each image or frame received from an image acquisition module or system 10.

FIG. 4 shows a method of operating an optical character recognition pre-localization system using hardware acceleration and optimization, according to at least one implementation. Specifically, computationally intense tasks can be performed on processors that have been optimized to perform such tasks, such as application specific integrated circuits (ASICs) or field programmable gate arrays (FPGAs), while less computationally intense tasks can be performed on general-purpose or less specialized processors, such as a central processing unit or a graphical processing unit. An application specific integrated circuit is a processor that has been custom-designed to perform a particular task, and thus has greater processing power and efficiency, but may have substantially more cost and lacks versatility. A field programmable gate array is a processor that can be programmed to optimize the internal circuit paths between the component gates of the processor to greatly improve performance as compared to a central processing unit, while the reprogrammability of the field programmable gate array affords more versatility than an application specific integrated circuits, and does not require specialized manufacturing.

In systems having an application specific integrated circuit, it is advisable to have as much of the method specifically designed into the application specific integrated circuit for maximum efficiency.

As shown in FIG. 4, in optical character pre-localization systems having a field programmable gate array 23, the field programmable gate array 34 may be programmed to apply a pyramid filter to the original frame, and the method for operating the optical character pre-localization system may include applying a pyramid filter to the original frame by the field programmable gate array. Similarly, the field programmable gate array may be programmed to tile the filtered image into a set of tiles of a defined tile size, and the method for operating the optical character pre-localization system may include the filtered image into a set of tiles of a defined tile size by the field programmable gate array. The field programmable gate array may be programmed to, for each tile, determine a contrast, a module value and a gradient angle, and the method for operating the optical character pre-localization system may include determining the contrast, the module value and the gradient angle by the field programmable gate array. The memory may include a set of instructions which when executed by processor(s), such as the field programmable gate array, may cause the system to perform these tasks, and the execution by the field-programmable gate array of a subset of the set of instructions may cause the system to perform one or more of the tasks discussed above.

Similarly, as illustrated in FIG. 4, in implementations where the processor includes a central processing unit, the central processor may identify a first tile of the set of tiles of the filtered image, wherein the contrast and the module values of the first tile are higher than a respective contrast threshold and module threshold, and the method for operating an optical character recognition pre-localization system may include identifying a first tile of the set of tiles of the filtered image, wherein the contrast and the module values of the first tile are higher than a respective contrast threshold and module threshold by the central processing unit. Similarly, the central processing unit may generate a region of interest of the original frame to be passed to an optical character recognition decoding module based on the first tile, and the method for operating an optical character recognition pre-localization system may include generating a region of interest of the original frame to be passed to an optical character recognition decoding module based on the first tile by the central processing unit. The memory may include a set of instructions which when executed by processor(s), such as the central processing unit, may cause the system to perform these methods, and the execution by the central processing unit of a subset of the set of instructions may cause the system to perform one or more of the tasks discussed above.

Figure 5:
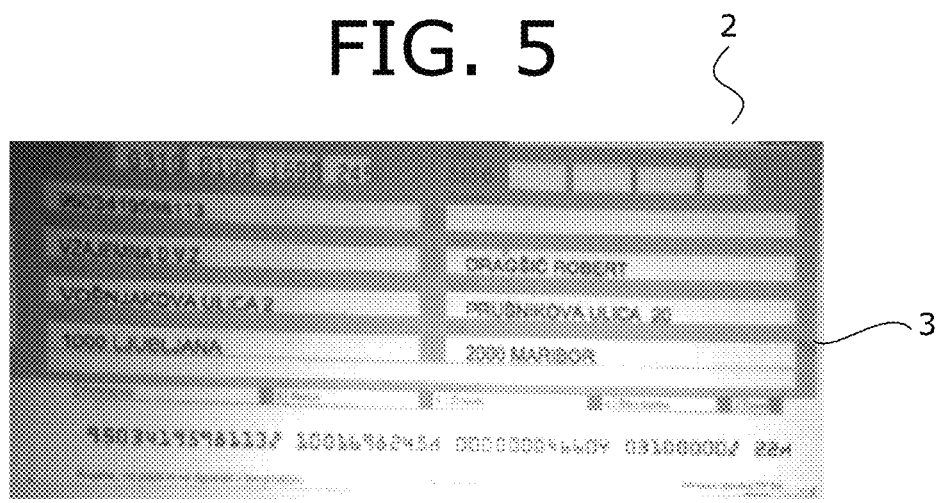
FIG. 5 is a gray-scale, original frame of an image.

FIG. 5 is a gray-scale, original frame 3 of an image 2 of a package label. The image 2 shown in FIG. 5 is exemplary of the types of images which may be processed by in an optical character recognition environment 1a, 1b. The image 2 may have been acquired by an image acquisition module or system, such as a smartphone camera, or a scanner.

FIG. 6 illustrates a gray-scale, filtered image 4 resulting from the original frame 3 of the image 2 of FIG. 5 having a two-level pyramid filter applied to it by an optical character recognition pre-localization module or system 20. The filtered image 4 has been created intentionally blurred relative to the original frame 3, and reduced in resolution relative to the original frame 3, as a result of applying a pyramid filter 102.

Figure 7:
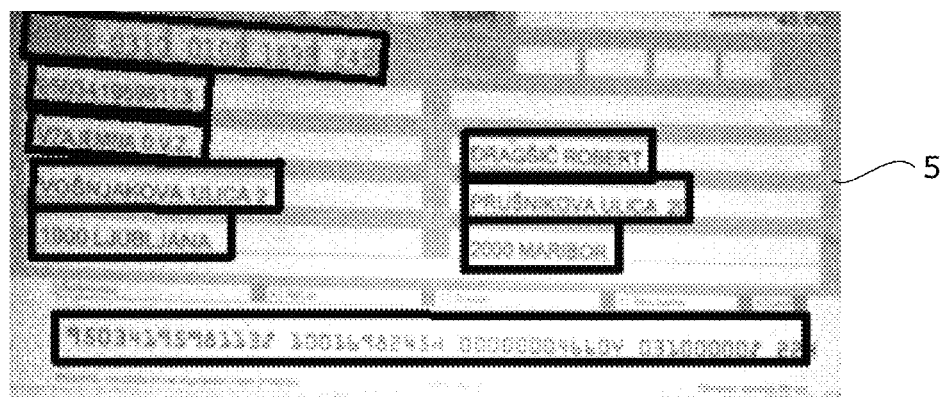
FIG. 7 illustrates the gray-scale, original frame of FIG. 5 with regions of interest identified therein.

FIG. 7 illustrates the gray-scale, final representation of the image 5, comprising the original frame 3 of FIG. 5 with regions of interest identified by the optical character recognition pre-localization module or system 20 superimposed thereon. This figure is a visualization of the output of the systems and methods described herein and need not be the format in which the regions of interest are communicated to an optical character recognition module or system 30.

Persons of skill in the art will recognize that the methods and systems set forth in this disclosure are exemplary, and can be implemented in any desired way, in any desired environment. For example, a typical environment may be an office setting, where image is scanned, and automatically passed to an optical character pre-localization module or system 20 and subsequently to an optical character recognition module or system 30, where either or both of these modules or systems may reside in the scanner or on a computer connected to the scanner directly or through a network. In such a system the user may have the option of manipulating the thresholds for contrast, module value and gradient angle before or during the image processing in order to maximize performance for a particular environment or image. The systems and methods described herein may also be implemented, for example in an autonomous robot to process incoming or outgoing packages. Thus the system may operate fully autonomously without user input, including the image acquisition module or system 10, the optical character recognition pre-localization module or system 20, and the optical character recognition module or system 30. Such systems may have an AI evaluate and manipulate the threshold settings to maximize results. Alternatively, the system can be implemented on a smart phone application with a back-end server, where the user acquires an image on their smart phone, and passes the image to a back-end server having or connected to an FPGA. In such a system, the smart phone acquires the image, and may apply a pyramid filter to the image. The original frame 3 and/or the filtered image 4 may be sent to the back-end server for processing, and a PDF of the image with optical character recognition information may be sent back to the user. Alternatively the entire optical character recognition process may be performed on the smartphone, with or without a field programmable gate array. The disclosed concepts may be implemented in any environment where optical character recognition may be desired, and in any suitable manner, with or without hardware acceleration.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation of an optical character recognition pre-localization system, comprising:
   receiving an image, comprising an original frame, to be pre-processed for optical character recognition;
   applying a pyramid filter to the original frame in order to create a filtered image containing blobs to be analyzed as potential regions of interest that may contain characters;
   tiling the filtered image into a set of tiles of a defined tile size;
   for each tile, determining a contrast, a module value and a gradient angle;
   identifying a first tile of the set of tiles of the filtered image, wherein the contrast and the module values of the first tile are higher than a respective contrast threshold and module threshold including the first tile having a difference between the gradient angle of the first tile and the gradient angle of an adjacent tile that is less than a gradient angle threshold, wherein the adjacent tile is one of a set of tiles adjacent to the first tile; and
   generating at least one region of interest of the original frame to be passed to an optical character recognition decoding module based on the first tile.

2. The method of claim 1, wherein applying a pyramid filter to the original frame comprises applying two levels of pyramid filters.

3. The method of claim 1, wherein the system comprises a field programmable gate array, and the applying a pyramid filter to the original frame includes applying a pyramid filter to the original frame by the field programmable gate array.

4. The method of claim 1, wherein the system comprises a field programmable gate array, and the tiling the filtered image into a set of tiles of a defined tile size includes tiling the filtered image into a set of tiles by the field programmable gate array.

5. The method of claim 1, wherein the filtered image comprises image rows corresponding to the set of tiles, and wherein the for each tile determining a contrast, a module value and a gradient angle further comprises appending the computed contrast, module value and gradient angle for each tile to the image rows corresponding to the respective tiles.

6. The method of claim 1, wherein the system comprises a field programmable gate array, and the for each tile determining a contrast, a module value and a gradient angle includes determining the contrast, the module value and the gradient angle by the field programmable gate array.

7. The method of claim 1, wherein the system comprises a central processing unit identifying the first tile of the set of tiles of the filtered image.

8. The method of claim 1, wherein the system comprises a central processing unit, and the generating at least one region of interest of to be passed to an optical character recognition includes generating at least one region of interest by the central processing unit.

9. The method of claim 1, wherein the for each tile determining a contrast, a module value and a gradient angle, the determining the module value and gradient angle for each tile comprises determining a respective gradient vector for each tile such that the respective module value is a magnitude of the respective gradient vector, and the respective gradient angle corresponds to a direction of the respective gradient vector.

10. An optical character pre-localization system, comprising:
at least one processor; and
a memory that stores processor-executable instructions which, when executed by the at least one processor, causes the system to:
receive an image, comprising an original frame, to be pre-processed for optical character recognition;
apply a pyramid filter to the original frame in order to create a filtered image containing blobs to be analyzed as potential regions of interest that may contain characters;
tile the filtered image into a set of tiles of a defined tile size;
for each tile, determine a contrast, a module value and a gradient angle;
identify a first tile of the set of tiles of the filtered image, wherein the contrast and the module values of the first tile are higher than a respective contrast threshold and module threshold including the first tile having a difference between the gradient angle of the first tile and the gradient angle of an adjacent tile that is less than a gradient angle threshold, wherein the adjacent tile is one of a set of tiles adjacent to the first tile; and
generate at least one region of interest of the original frame to be passed to an optical character recognition decoding module based on the first tile.

11. The system of claim 10, wherein the at least one processor comprises a field programmable gate array, and when executed the processor-executable instructions cause the field programmable gate array to apply a pyramid filter to the original frame.

12. The system of claim 10, wherein the processor comprises a field programmable gate array, and wherein when executed the processor-executable instructions cause the field programmable gate array to tile the filtered image into a set of tiles.

13. The system of claim 10, wherein the filtered image comprises image rows corresponding to the set of tiles, and wherein when executed the processor-executable instructions cause the system to determine a contrast, a module value and a gradient angle, further causes the system to append the contrast, module value and gradient angle for each tile to the image rows corresponding to the respective tiles.

14. The system of claim 10, wherein the processor comprises a field programmable gate array, and when executed the processor-executable instructions cause the field programmable gate array to determine a contrast, a module value and a gradient angle.

15. The system of claim 10, wherein the processor comprises a central processing unit, and wherein when executed the processor-executable instructions cause the central processing unit to identify the first tile of the set of tiles of the filtered image.

16. The system of claim 10, wherein the system comprises a central processing unit, and wherein when executed the processor-executable instructions cause the central processing unit to generate at least one region of interest.

17. The system of claim 10, wherein to determine a contrast, a module value and a gradient angle for each tile, causes the system to determine a respective gradient vector for each tile such that the respective module value is a magnitude of the respective gradient vector, and the respective gradient angle corresponds to a direction of the respective gradient vector.

18. An optical character pre-localization system, comprising:
a central processing unit;
a field programmable gate array;
a memory;
wherein the field programmable gate array is programmed to:
receive an image, comprising an original frame, to be pre-processed for optical character recognition,
apply a pyramid filter to the original frame in order to create a filtered image containing blobs to be analyzed as potential regions of interest that may contain characters,
tile the filtered image into a set of tiles of a defined tile size; and
for each tile in the set of tiles, determine a contrast, a module value and a gradient angle; and
wherein the memory stores a set of instructions that, as a result of execution by the processor causes the system to:
identify a first tile of the set of tiles of the filtered image, wherein the contrast and the module values of the first tile are higher than a respective contrast threshold and module threshold including the first tile having a difference between the gradient angle of the first tile and the gradient angle of an adjacent tile that is less than a gradient angle threshold, wherein the adjacent tile is one of a set of tiles adjacent to the first tile, and
generate at least one region of interest of the original frame to be passed to an optical character recognition decoding module based on the first tile.

19. The system of claim 18, further comprising an image acquisition system configured to acquire the image to be processed.

20. The system of claim 19, wherein the image acquisition system includes at least one of a scanner, a camera, a sensor, or a network communication device.

* * * * *